W. F. MacGREGOR.
ROTARY PLOW.
APPLICATION FILED JUNE 27, 1914.
1,207,310.
Patented Dec. 5, 1916.
3 SHEETS—SHEET 2.
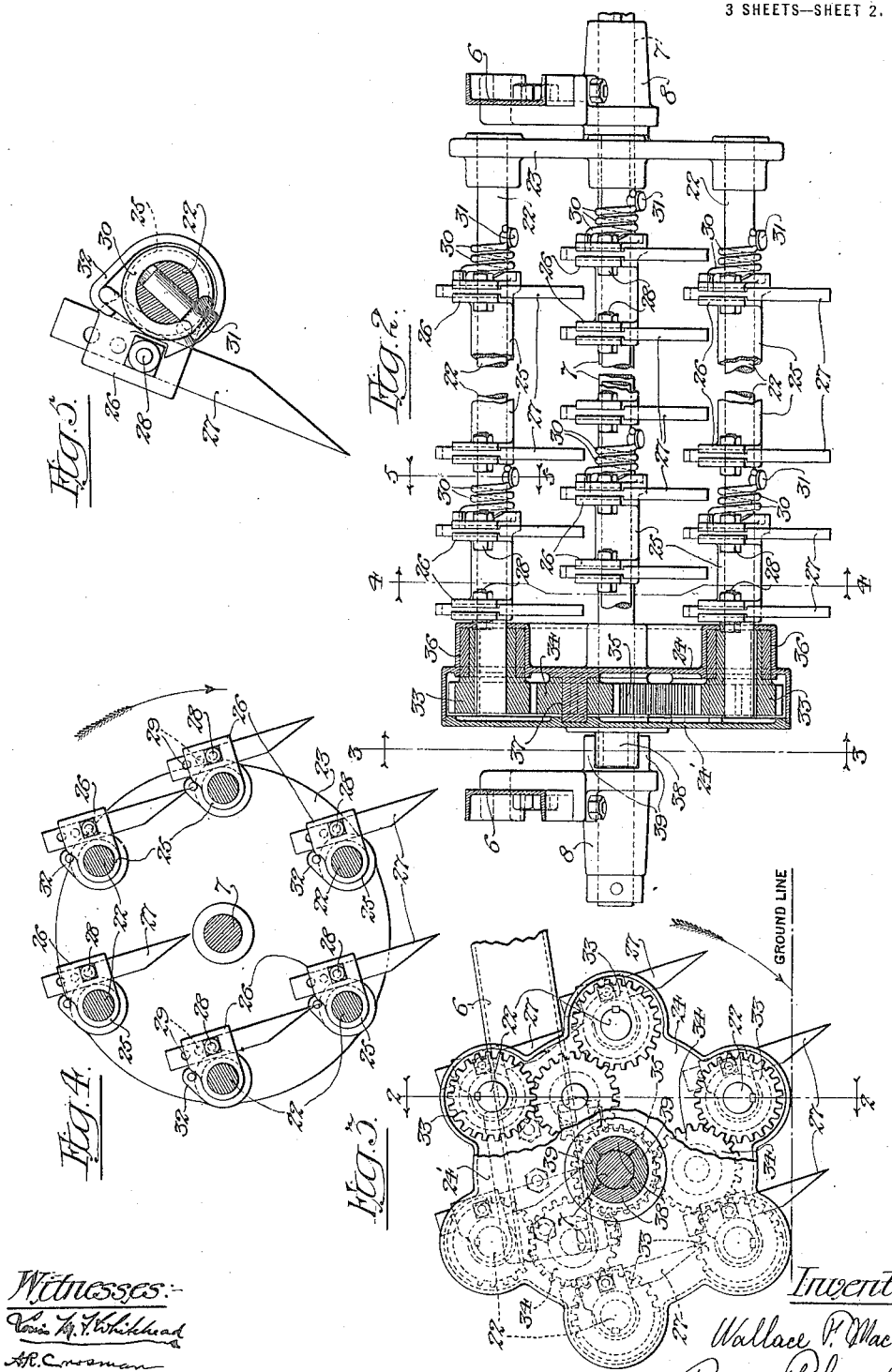

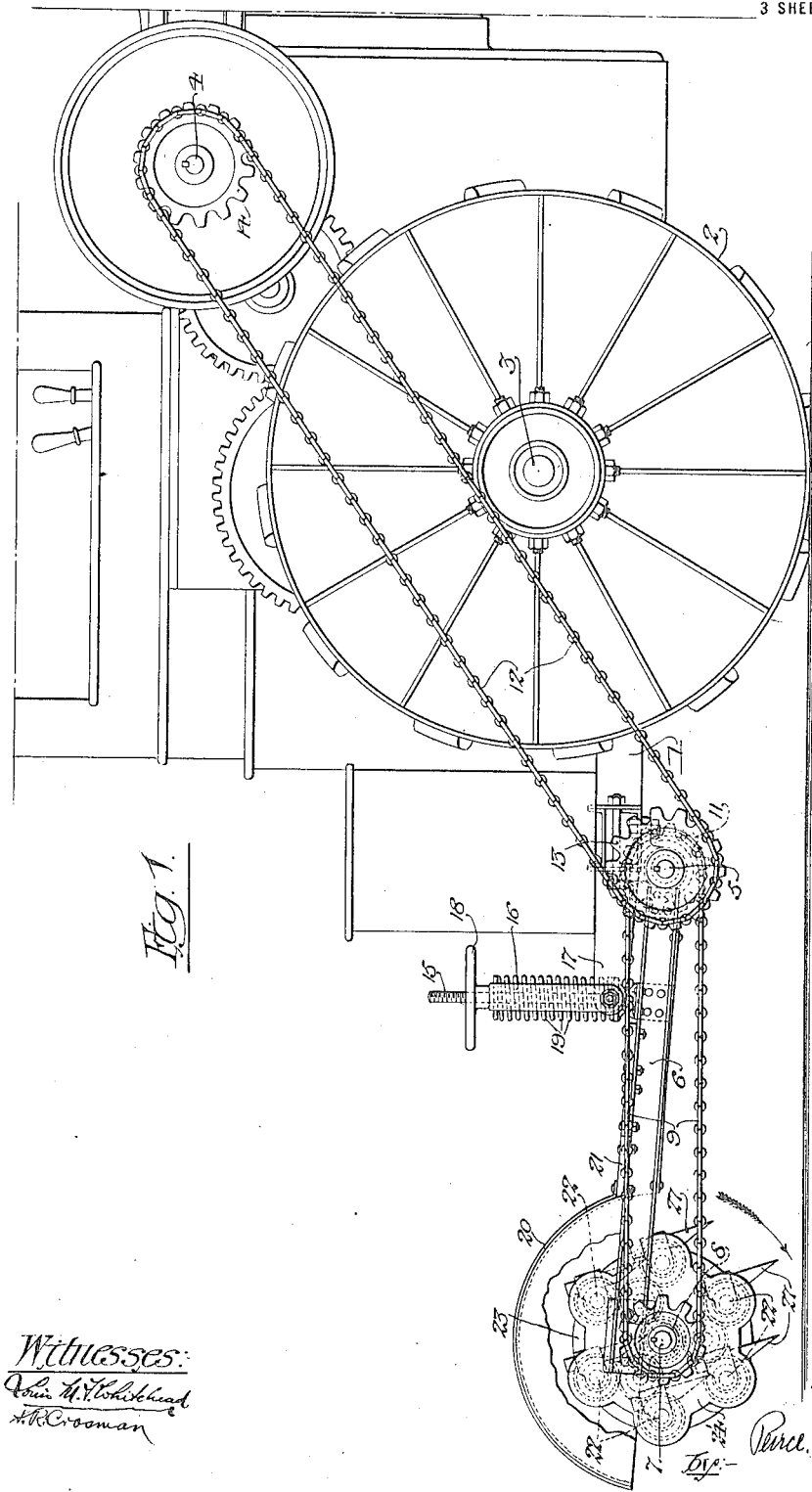

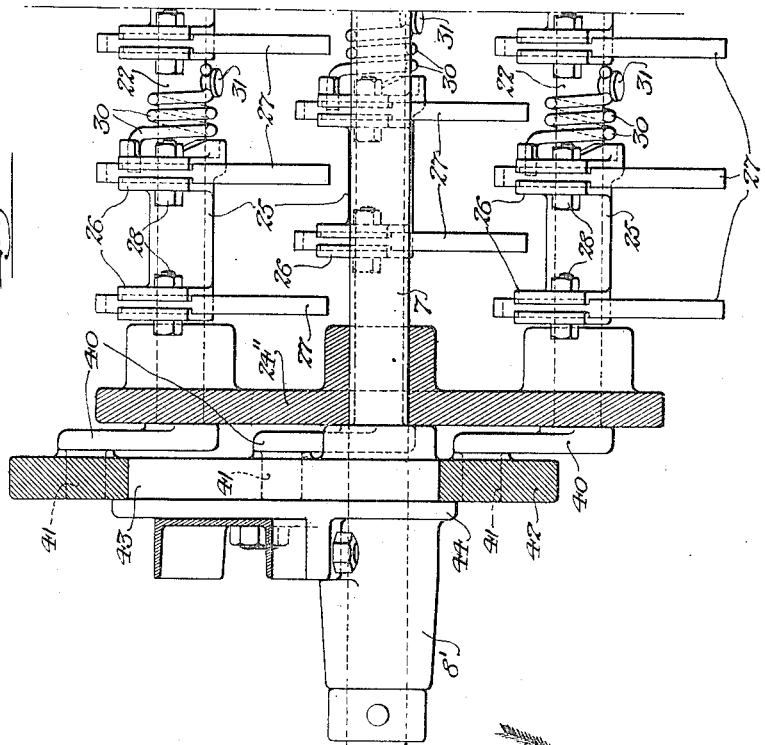

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

ROTARY PLOW.

1,207,310. Specification of Letters Patent. Patented Dec. 5, 1916.

Application filed June 27, 1914. Serial No. 847,619.

*To all whom it may concern:*

Be it known that I, WALLACE F. MAC-GREGOR, a citizen of the United States, and a resident of Racine, county of Racine, and State of Wisconsin, have invented certain new and useful Improvements in Rotary Plows, of which the following is a full, clear, and exact description.

The invention relates to rotary plows or soil milling machines and seeks to provide an improved, power-operated rotary plow or soil milling tool which will act effectively to break up and pulverize the soil as it is drawn over the ground.

The invention consists of the features of improvement hereinafter set forth, illustrated in the preferred form in the accompanying drawings and more particularly pointed out in the appended claims.

In the drawings Figure 1 is a side elevation of the improved rotary plow or soil milling machine and the rear portion of a tractor to which the machine is connected. Fig. 2 is a detailed elevation of the soil milling tool with parts shown in section on the line 2—2 of Fig. 3. Fig. 3 is a cross section on the line 3—3 of Fig. 2, with a portion of the gear casing broken away. Figs. 4 and 5 are the detailed sections of the lines 4—4 and 5—5 respectively of Fig. 2. Fig. 6 is a side elevation illustrating a modification of the improved soil milling tool. Fig. 7 is a detailed section on line 7—7 of Fig. 6.

The improved soil milling machine or rotary plow is adapted to be connected to a suitable draft frame and preferably to the rear portion of the frame 1 of a suitable tractor. The latter, in the form shown, is provided with traction wheels 2 carrying a rear axle 3, the axle being connected by suitable gearing with the drive shaft 4 of the tractor. A counter shaft 5 is journaled at the lower rear portion of the tractor or draft frame and the frame of the rotary plow is hung upon this counter shaft. The frame of the rotary plow comprises suitably connected side bars 6, which are hung at their forward ends upon the counter shaft 5 to permit the vertical movement of the soil milling tool or rotary plow carried thereby.

The soil milling tool is mounted upon a shaft 7 which is journaled in suitable bearings 8 at the rear ends of the side bars 6. A chain 9 passes over a sprocket 10 on one end of the shaft 7 and over a sprocket 11 on one end of the counter shaft 5. A drive chain 12 connects a sprocket 13 on the counter shaft with a sprocket 14 on the main drive shaft of the tractor. In this way the rotary soil milling tool carried by the shaft 7 is driven in forward direction as indicated by the arrows in Figs. 1 and 3 as the machine moves forwardly over the ground.

A screw 15 is connected to the frame bar 6 and extends through a suitable yoke 16 which is pivotally connected at its lower end to a bracket 17 that is fixed to the lower rear portion of the tractor frame. A hand-wheel 18 threaded on the screw 15 into engagement with the yoke serves to raise and lower the soil milling tool. A spring mounted on the screw serves to force the milling tool to working position in the ground. Preferably as shown, the soil milling tool is covered by a semi-cylindrical shield 20 fixed to the rear ends of the side bars 6. In front of the shield a platform 21 is mounted on the side bars.

The soil milling tool comprises a circular series of supporting bars or shafts 22, which are journaled at their ends in two heads 23 and 24, which are fixed to the drive shaft 7 adjacent the bearings 8 therefor. A series of tooth holders, preferably in the form of sleeves 25 are loosely mounted or journaled on the bars or shafts 22, and each sleeve is provided at its ends with laterally projecting split clamps 26. Soil cutting teeth 27, having sharpened beveled ends are arranged within the clamps 26 of the toothholders and are secured thereto by bolts 28. Each tooth is provided with a series of holes 29 for the bolt 28, so that it can be longitudinally adjusted in the tooth-holding clamp. Coiled springs 30 are mounted upon the bars or shafts 22 adjacent to the tooth holders, one end of each spring being connected to a stud 31, fixed to the bar or shaft 22, and the other end of the spring being connected to the end of the corresponding tooth holder. In the form shown, each tooth holder is provided at one end with a perforated ear 32, which is engaged by the end of the spring 30.

Suitable means is provided for adjusting or feathering the tooth supporting bars 22 as the tool is rotated, so that the soil cutting teeth will be presented at a proper angle to the ground. In the construction shown in Figs. 1, 2 and 3, a pinion 33 is fixed to one end of each of the tooth supporting bars or shafts 22, and these pinions are connected by intermediate idler pinions 34 to a pinion 35 mounted on the shaft 7. Preferably as shown, the head 24 is hollow and comprises a main body portion and a cover plate 24' so as to form an inclosing case for the pinions 33, 34 and 35. As shown, the main body portion of the head is provided with suitable bearings 36 for the hubs of the pinions 33, and also with inwardly projecting studs 37 whereon the intermediate pinions 34 are mounted. In the construction shown, a single intermediate pinion serves to connect two of the pinions 33 to the central pinion 35. The latter is held against rotation, and in the construction shown, its hub comprises segmental portions 38, which interlock with corresponding segmental portions 39 on the end of the adjacent shaft bearing 8.

As the machine is drawn forwardly over the ground, the soil milling tool will be rotated in the direction indicated by the arrows in Figs. 1 and 3. The gearing described serves to adjust or feather the supporting bars 22 so that the soil cutting teeth are maintained substantially parallel and are presented at a proper angle to the ground. Preferably as shown, the teeth are inclined downwardly and forwardly with respect to the ground line, as indicated in Fig. 3. By means of the teeth 27, the soil is effectively broken up and pulverized, and the machine can be advantageously used as a substitute for the ordinary plow. In case one of the teeth strikes an obstruction, it and the corresponding tooth holder will yield against the tension of its spring 30 so that the parts will not be broken. As soon as the obstruction is passed, the spring will return the tooth holder and teeth carried thereby to proper operative position. The teeth may be adjusted longitudinally in the holders or clamps to thereby vary the working depth.

The construction shown in Figs. 6 and 7 is similar to that heretofore described, except that a different means is provided for adjusting or feathering the tooth supporting bars. In this construction, the tooth supporting bars or shafts are provided with crank arms 40 having crank pins 41 thereon which engage suitable bearing openings formed in an eccentric strap or ring 42. This eccentric strap or ring is mounted upon a stationary eccentric 43, the ring being held in place between the crank arms 40 and a flange 44 formed on the eccentric. In the construction shown the eccentric 43 is formed in one piece with the adjacent bearing 8' of the shaft 7. This mechanism, like the gearing shown in Figs. 3 and 4, will serve to adjust or feather the tooth supporting bars and maintain the soil cutting teeth in proper angular relation to the ground.

It is obvious that numerous changes may be made in the details set forth, without departing from the essentials of the invention as defined in the claims.

I claim as my invention:

1. In a rotary plow, the combination with a frame, of a power operated, rotary, soil milling tool mounted on said frame and comprising heads in a circular series of supporting shafts journaled in said heads, holders loosely mounted on said shafts, soil cutting teeth rigidly mounted on said holders, springs connecting said shafts and said holders to yieldingly maintain the same and said teeth in working position, and feathering mechanism connected to said shafts to positively rotate the same in said heads as said tool is rotated, substantially as described.

2. In a rotary plow, the combination with a frame, of a power operated soil milling tool rotatably mounted in said frame and comprising a shaft, two heads thereon, a circular series of supporting shafts journaled in said heads, holders loosely mounted on said shafts, soil cutting teeth on said holders, springs connected to said shafts and said holders for yieldingly maintaining the same and said teeth in working position, a stationary controlling member, and connections between said member and said supporting shafts for positively rotating the latter as said tool is rotated, substantially as described.

3. In a rotary plow, the combination with a frame, of a power-operated soil-milling tool rotatably mounted on said frame and comprising a circular series of supporting bars, sleeves loosely mounted on said bars and provided with laterally projecting clamps, soil-cutting teeth adjustably secured in said clamps and springs coiled about said bars and connected thereto and to said sleeves for maintaining the latter and said teeth in working position, substantially as described.

4. In a rotary plow, the combination with a frame, of a power-operated soil-milling tool rotatably mounted on said frame and comprising a series of supporting bars, sleeves loosely mounted on said bars and provided with projecting clamps, soil cutting teeth adjustably secured in said clamps, coiled springs yieldingly connecting said sleeves to said bars, and mechanism for feathering said bars as the tool is rotated.

5. In a rotary plow, the combination with a frame, of a soil-milling tool rotatably mounted in said frame and comprising a circular series of supporting bars, soil-cutting teeth yieldingly mounted on said bars, mechanism for rotating said tool in forward direction, and feathering mechanism connected to said tooth-supporting bars for maintaining said teeth at a downwardly and forwardly inclined angle to the ground, substantially as described.

6. In a rotary plow, the combination with a frame, of a soil-milling tool rotatably mounted on said frame and comprising a circular series of supporting bars, sleeves loosely mounted on said bars, soil-cutting teeth clamped to said sleeves, springs coiled about said bars and connected thereto and to said sleeves for maintaining the latter and said teeth in position on said bars, mechanism for rotating said tool in forward direction and feathering mechanism connected to said supporting bars for positively shifting the same as the tool is rotated to thereby maintain said teeth at an incline to the ground, substantially as described.

WALLACE F. MacGREGOR.

Witnesses:
 THEO. JOHNSON,
 PATRICK W. MORRISSEY.

Copies of this patent may be obtained for five cents each, by addressing the "Commissioner of Patents, Washington, D. C."